Patented Oct. 13, 1953

2,655,433

UNITED STATES PATENT OFFICE 2,655,433

PROCESS FOR PRODUCTION OF UNCTUOUS GRAPHITE

Daniel Gardner, New York, N. Y.

No Drawing. Application January 22, 1949, Serial No. 72,280

7 Claims. (Cl. 23—209.1)

This invention relates to unctuous graphite and is more particularly concerned with a process for production of the same.

A great deal of research work has been done by the carbon industry in an effort to obtain a highly unctuous synthetic graphite. It is recognized that by subjecting amorphous carbon to temperatures exceeding 1750° C. surface graphitization of the carbon commences. Though such graphite resembles natural graphite in a number of its aspects, it does not satisfy the requirements of a truly unctuous product. Similarly, where graphite has been produced from various hydrocarbons at high temperatures, the particles of carbon produced are of such size that the graphitization occurs only on their surfaces, amounting to no more than a graphitic skin on the carbon particle.

Attempts have, accordingly, been made to produce graphite at a lower temperature and thus obtain the unctuous property desired. One of these attempts includes the production of graphite from acetylene at temperatures between 400° C. and 500° C. using reduced copper as a reagent to break down the acetylene. The product here, however, is undesirable for it is contaminated by the copper which cannot be removed and imparts metallic effects to the product.

I have devised a process for the production of highly unctuous graphite which is free of any of the prior art drawbacks. The steps in the process are carried out at low temperatures in order to avoid the undesirable effects of high temperature performance, and though I employ an unsaturated hyrocarbon as raw material, my process proceeds without the introduction of reagents likely to contaminate the product, such as the copper heretofore mentioned. Nevertheless, the process goes forward directly and economically, and results in a high proportion of unctuous graphite with respect to the raw material employed.

It is the principal object of my invention to produce a truly unctuous synthetic graphite.

Another object of my invention is to produce synthetic trivalent graphite in pure state.

Another object of the invention is to produce an unctuous graphite having the particles thereof in the finest state of subdivision.

Still another object is to produce an unctuous graphite in which each of the impalpable carbon particles is totally graphitized.

Further and more detailed objects of the invention will be apparent as the description of the invention proceeds.

To start with, the process of my invention first calls for production of graphite in the finest particle size and purity. The process also requires that such graphite be maintained at the lowest possible temperature through its treatment. It is also important that, during the process, contact of the raw material with all active gases, such as for example, hydrogen, oxygen and sulfur derivatives, be avoided. It is furthermore important that the process be carried out in an atmosphere of a gas which is inert with respect to the raw material at the temperatures employed. The known inert gases can be used, or the process can be carried on in a vacuum, but preferably I employ nitrogen, since it does not react with carbon below a temperature of below 1325° C. which is far above the maximum temperature of my process. Nitrogen serves as an excellent control at the temperatures employed in my process.

As has already been pointed out, the quality of graphite is seriously affected by the presence of impurities, thus any materials calculated to contaminate the final product are avoided. Thus, in accordance with my process I employ as aids only such materials as entirely pass off, or are removed, in the course of the processing.

As the raw material with which to commence my process, I employ an unsaturated hydrocarbon, preferably acetylene ($C_2H_2$) due to its low hydrogen content. Other unsaturated hydrocarbons of the acetylenic group, such as ethylene ($C_2H_4$) may, however, be used. Considering the start to be with acetylene gas, the same is introduced into a chamber where it is passed between two spaced electrodes made from high grade graphite. This operation may be carried on in an atmosphere of an inert gas, or in a vacuum, but the nitrogen is preferable. As already pointed out, care must also be taken to see that none of the materials which form explosive acetylides can come in contact with the acetylene gas during the process. Metals to be particularly avoided here are copper, silver and mercury.

To remove the carbon from the acetylene gas, I employ a high voltage, high frequency current to form a spark across the gap between the electrodes. The voltage of the current is preferably in the region of 100,000 volts at a frequency of substantially 500 kilocycles. As the acetylene gas first starts to pass this gap, a fogginess is noted which is followed by a fall of intense black snow. This is caused by the splitting of the acetylene by the electric current, with a portion of the acetylene remaining in unaltered form, but the majority of it being split into the very fine pure carbon particles of the falling snow, and hydrogen gas. The hydrogen gas and the remaining portion of the acetylene gas which has not been split is carried off from the chamber into a wash bottle, or other suitable receptacle, and thus avoids any further contact with the carbon. Acetylene gas, containing as it does a small portion of hydrogen, is particularly suitable for the quantity production of impalpable, finely divided, carbon in accordance with my process. However, it is essential that all of the remaining acetylene, as well as the hydrogen gas, be removed before the carbon particles undergo further treatment. These carbon particles, though finely divided as desired for the resultant product, are still tetravalent, as was the case while they formed part of the acetylene gas. Before passing from the description of the above step, it is well to point out that when the ratio of the gas to be taken off from the chamber reaches seven (7) volumes of hydrogen to one (1) volume of acetylene, this is the limit of the reaction by which the carbon particles are given off. Thereafter, a reverse reaction commences and acetylene is again formed if given the opportunity.

The carbon particles collected as a result of splitting the acetylene gas are next introduced into a high boiling point hydrocarbon and are dispersed throughout the same. The purpose of this is in order to obtain uniform action in the passing of the carbon particles over from the non-graphitic to the graphitic form. The carbon particles here are so small that they have lost all their heat conductivity and have gained the highest degree of insulation. Thus, if an attempt were made to change them from the non-graphitic to the trivalent form by means of high temperature, it would be difficult to get any result, and also the unctuousness achieved would be small. However, I have found that by properly dispersing the particles in a heavy hydrocarbon, with which no chemical action takes place, and then heating the whole mass at a low temperature, the results are the opposite.

The high boiling point hydrocarbon which I prefer to use is anthracene ($C_{14}H_{10}$). This is a heavy liquid, and although the particles can be dispersed in it by suitable mixing, it is a time consuming process, so it is desirable to use something in the nature of an incorporator to expedite the dispersion. Benzine up to five percent (5%) of the anthracene may be used to increase the action of the anthracene. It has a much lower boiling point than anthracene, and is entirely soluble with it, so is admirably suited to assist in taking the carbon particles into the anthracene and dispersing them throughout it. Furthermore, it boils and comes off below the temperature to which the anthracene and carbon are subsequently to be heated. Thus, it may be driven off and restored to its original state for reuse.

Separately, or in addition to the benzine, I have found that ammonium salts, such as ammonium oleate, ammonium nitrate, ammonium stearate, or an ammonium halide, may be advantageously used as an incorporator. Preferably, I employ ammonium oleate for, though it contains oxygen, it sticks together and does a job of dispersing the carbon particles without contaminating them. It is introduced as a liquid, and, after having done its job, is passed off as a gas.

Assuming then that the fine carbon particles are dispersed in the anthracene, to which is added a small quantity of benzine and a small quantity of ammonium oleate, I introduce the whole mixture into a colloidal mill to assist in the mixing. This mixing, as already pointed out, could be accomplished without the benzine, or ammonium salts, but due to the time required it is preferable to employ one, or more, of these incorporators. After the mixing, the mixture is introduced into a suitable heating apparatus, again in an atmosphere of nitrogen, or an inert gas, or vacuum, care being taken that no air or active gases are present. The mix is then heated to a temperature of from 360° C. to 600° C. which serves to drive off the incorporator and ammonium salt, and effects the crystallographic regrouping of the carbon particles by assuring that they are heated thoroughly, since they are surrounded by a heating medium. Whether the heating has been carried on to sufficient extent can, of course, be determined by an examination of the finished product. In view of the fact that the carbon particles are extremely impalpable, I have found that it is possible to induce graphitization at once if the mix is heated to just below the upper limit of 600° C. Going above that temperature would, however, be destructive of the desired result, so that it is much more practical and safer not to carry the heating too close to the upper limit. At temperatures substantially below the upper limit the change-over from non-graphitic to graphitic form takes place in a short period of time, with complete graphitization and full unctuousness of the product resulting.

The treated carbon particles are retrieved from the anthracene carrier by passing the mixture through a filter press. Here the liquid is removed and the graphite particles remain.

In place of anthracene, naphthalene ($C_{10}H_8$), picene ($C_{22}H_{14}$), or other high boiling hydrocarbons may be employed. If so, the procedures are substantially the same as is the case where anthracene is used. Furthermore, the temperature at which the heating takes place ranges between 360° C. and 600° C. in order to obtain complete graphitization of the carbon particles.

Having described my invention what I claim as new and desire to secure by Letters Patent is:

1. A process for the production of unctuous graphite which comprises introducing impalpably fine particles of carbon into anthracene, heating the mixture of carbon and anthracene to a temperature of from 360° to 600° C. to convert the substantially non-graphitic carbon to pure unctuous graphite and separating the graphite from the anthracene.

2. A process for the production of unctuous graphite which comprises introducing impalpably fine particles of pure substantially non-graphitic carbon into a body of anthracene, introducing a small percentage of benzine into said body of anthracene to assist in the dispersion of the carbon particles throughout the anthracene, mixing the carbon particles and anthracene to disperse the particles throughout the same, and heating said mixture to a temperature of between 360° and 600° C. to drive off the benzine and to convert the carbon to unctuous graphite.

3. A process for the production of unctuous graphite which comprises introducing impalpably fine particles of pure substantially non-graphitic carbon into a body of anthracene, introducing small percentages of benzine and an ammonium salt into said body of anthracene to assist in the dispersion of the carbon particles throughout the anthracene, mixing the carbon particles and anthracene to disperse the particles throughout the same, and heating said mixture to a temperature of between 360° and 600° C. to drive off the benzine and ammonium salt and to convert the carbon to unctuous graphite.

4. A process for the production of unctuous graphite which comprises introducing impalpably fine particles of pure carbon into a body of anthracene, introducing small percentages of benzine and ammonium oleate into said body of anthracene to assist in the dispersion of the carbon particles throughout the anthracene, mixing the carbon particles and anthracene to disperse the particles throughout the same, and heating said mixture to a temperature of between 360° and 600° C. to drive off the benzine and ammonium oleate and to convert the carbon to unctuous graphite.

5. A process for the production of unctuous graphite which comprises introducing impalpably fine particles of substantially non-graphitic carbon into anthracene, heating the mixture of carbon and anthracene to a temperature from 360° to 600° C. in an atmosphere of a gas inert to the materials heated within the temperature range of the heating, to convert the carbon to unctuous graphite and separating the graphite from the anthracene.

6. A process for the production of unctuous graphite which comprises introducing fine particles of non-graphitic carbon into a high boiling-point hydrocarbon with which the carbon does not react, heating the mixture to a temperature of between 360° C. and 600° C. to graphitize the carbon and thereafter removing the graphite so formed from the mixture.

7. A process for the production of unctuous graphite which comprises mixing fine particles of non-graphitic carbon with anthracene containing a small percentage of benzine and an ammonium oleate, to obtain a maximum dispersion of said carbon particles in the anthracene, heating the mixture to a temperature of between 360° C. and 600° C. to drive off the benzine and the ammonium oleate in gaseous form and to convert the carbon particles into unctuous graphite.

DANIEL GARDNER.

References Cited in the file of this patent

UNITED STATES PATENTS

| Number | Name | Date |
| --- | --- | --- |
| 1,352,085 | Rose | Sept. 7, 1920 |

OTHER REFERENCES

Kaufmann: Acetylene Carbon Black, Canadian Chem. and Met., vol. 17, May 1933, pages 93–95.

Berthelot: Compt. Rend., vol. 54, page 1044 (1862).

Mellor: Inorganic and Theoretical Chem., vol. 5, Longmans, Green and Co., N. Y., 1924, pages 732, 740 and 837–9.

Inside the Flame: Published by Godfrey L. Cabot, Inc., Boston, Mass., 1939, pages 7–13.